United States Patent
Yost

(10) Patent No.: US 9,680,905 B2
(45) Date of Patent: Jun. 13, 2017

(54) SYSTEM FOR INTELLIGIBLE AUDIO CONVERSATION OVER UNRELIABLE DIGITAL TRANSMISSION MEDIA

(71) Applicant: David Arthur Yost, Los Altos, CA (US)

(72) Inventor: David Arthur Yost, Los Altos, CA (US)

( * ) Notice: Subject to any disclaimer, the term of this patent is extended or adjusted under 35 U.S.C. 154(b) by 27 days.

(21) Appl. No.: 14/580,661

(22) Filed: Dec. 23, 2014

(65) Prior Publication Data
US 2015/0180932 A1    Jun. 25, 2015

Related U.S. Application Data

(60) Provisional application No. 61/920,310, filed on Dec. 23, 2013.

(51) Int. Cl.
*H04L 29/06* (2006.01)
(52) U.S. Cl.
CPC ................................ *H04L 65/80* (2013.01)
(58) Field of Classification Search
CPC ....................................................... H04L 65/80
See application file for complete search history.

(56) References Cited

U.S. PATENT DOCUMENTS

| | | | |
|---|---|---|---|
| 5,708,664 A | 1/1998 | Budge et al. |
| 8,335,504 B2 | 12/2012 | Aaron |
| 8,358,659 B2 | 1/2013 | Lingafelt et al. |
| 8,418,039 B2 | 4/2013 | Birmingham et al. |
| 8,437,284 B2 | 5/2013 | Plamondon et al. |
| 8,467,308 B2 | 6/2013 | Johnston |
| 8,483,679 B2 | 7/2013 | Meloche et al. |
| 8,494,153 B2 | 7/2013 | Brown et al. |
| 8,520,823 B2 | 8/2013 | Van Der Laak et al. |
| 8,526,416 B2 | 9/2013 | Chun et al. |

(Continued)

FOREIGN PATENT DOCUMENTS

| | | |
|---|---|---|
| EP | 1 111 822 A2 | 6/2001 |
| WO | WO 2006/130270 A1 | 12/2006 |

OTHER PUBLICATIONS

Mar. 30, 2015 Notification of Transmittal of the International Search Report and Written Opinion issued in PCT/US2014/072053.

*Primary Examiner* — Parth Patel
(74) *Attorney, Agent, or Firm* — Buchanan Ingersoll & Rooney PC

(57) ABSTRACT

During unfavorable network conditions, a system provides a fallback mode that ensures conversation intelligibility and eliminates dropouts. In the fallback mode, the system uses data retransmission and mitigates retransmission delay by breaking input and output audio into segments for flow control and by involving the users in flow control. On the receive end, when necessary, the system pauses audio output and indicates the pause to the receiving user to inform the receiving user that the pause is a system artifact rather than silence from the transmitting user. On the transmit end, when necessary to avoid accumulation of excessive end-to-end delay, the system suspends audio input and indicates the suspension to the transmitting user to inform the transmitting user that audio input is temporarily being ignored. The transmit end of the system decides when to suspend audio input based on current end-to-end delay, which is continually communicated from the receive end.

6 Claims, 2 Drawing Sheets

(56) References Cited

U.S. PATENT DOCUMENTS

| | | |
|---|---|---|
| 8,537,668 B2 | 9/2013 | Lai |
| 8,578,247 B2 | 11/2013 | Zopf et al. |
| 8,605,620 B2 | 12/2013 | Beightol et al. |
| 2001/0023454 A1* | 9/2001 | Fitzgerald ............... H04L 47/10 709/233 |
| 2002/0015108 A1* | 2/2002 | Takashima ............. H04N 7/152 348/484 |
| 2002/0111812 A1* | 8/2002 | Buchholz .............. H04J 3/0632 704/278 |
| 2003/0223466 A1* | 12/2003 | Noronha, Jr. ........ H04N 21/226 370/537 |
| 2004/0063454 A1* | 4/2004 | Sasaki ..................... H04L 12/12 455/522 |
| 2004/0160979 A1* | 8/2004 | Pepin ................... H04L 1/0009 370/462 |
| 2004/0247112 A1* | 12/2004 | Lee .................... H04M 3/2236 379/414 |
| 2007/0236599 A1* | 10/2007 | van Beek ............... H04N 7/163 348/419.1 |
| 2008/0049795 A1* | 2/2008 | Lakaniemi ........... H04L 43/087 370/516 |
| 2009/0092083 A1* | 4/2009 | Shagdar .............. H04L 41/5003 370/328 |
| 2011/0007638 A1* | 1/2011 | Xu ........................ H04W 80/06 370/252 |
| 2013/0301809 A1 | 11/2013 | Dunne et al. |
| 2013/0332926 A1* | 12/2013 | Jakoljevic ........... G06F 9/45533 718/1 |
| 2013/0343265 A1* | 12/2013 | Ehsan .................. H04J 3/0632 370/328 |
| 2014/0362704 A1* | 12/2014 | Jha ....................... H04W 36/22 370/237 |
| 2015/0073967 A1* | 3/2015 | Katsuyama ............. H04L 47/12 705/37 |
| 2015/0081508 A1* | 3/2015 | Schwall ................. G06Q 40/04 705/37 |
| 2015/0120901 A1* | 4/2015 | Baumgartner ........ H04L 41/507 709/224 |
| 2015/0257096 A1* | 9/2015 | Lee .................. H04W 52/0206 370/311 |
| 2015/0332165 A1* | 11/2015 | Mermoud ............... G06N 5/048 706/12 |
| 2015/0358368 A1* | 12/2015 | Wiseman ............ H04L 65/1093 709/204 |

\* cited by examiner

SYSTEM FOR INTELLIGIBLE AUDIO CONVERSATION OVER UNRELIABLE DIGITAL TRANSMISSION MEDIA

RELATED APPLICATION

This application claims priority to U.S. Provisional Application No. 61/920,310, filed on Dec. 23, 2013.

TECHNICAL FIELD

The present disclosure relates to a system for providing intelligible audio conversation over unreliable digital transmission media, in order to allow users to hold a conversation over the digital transmission medium, employing codecs, data transmission protocols, and user interaction techniques. Examples of such technology are mobile telephone calls, VOIP telephone calls, Internet audio chat, and Internet audio/video chat.

BACKGROUND

To handle data transport disruptions, existing systems for providing audio conversation over unreliable transmission media use packet loss mitigation (PLM) techniques that manipulate audio to correct for packet loss or delay. These techniques are appropriate and necessary when used in moderation. However, when overused they can degrade the quality of the audio below the level of intelligibility.

Examples of PLM Techniques:
  Interpolation—Replace missing portions of audio with interpolated audio. When interpolation is done to excess, the result can be audio that resembles normal speech but really is not.
  Slowing down—Replace missing portions of audio with slowed-down audio taken from before or after the missing portion.
  Speeding up—Speed up delayed audio to lower the transmission delay.
  Changing codecs—Lower the demands on network bandwidth by changing the parameters of the audio codec in use or by switching to a different codec to lower the data rate.
  Forward Error Correction—Replicate audio data redundantly in the transmission.

In existing systems, the user experiences unintelligible or missing audio when sufficient data is not delivered over the network in a timely fashion. Importantly, the user has trouble knowing when whole portions of the conversation have been lost. The transmitting user has no way of knowing when his speech has been delivered unintelligibly or not at all, and the listening user often has no way of knowing that some of what he or she should have heard has been deleted by the system. Furthermore, a call can be dropped altogether, and the transmitting user doesn't become aware for quite a long time that everything he said was deleted. Users often are forced to try to unravel the resulting miscommunication, compounding the problems.

SUMMARY

An exemplary embodiment of the present disclosure provides a system for limiting accumulation of end-to-end delay (EED), which represents a time interval between a time of acceptance of input data from a transmitting user and a time of outputting of the data to a receiving user utilizing a remote system, after transmission of the data over a network. The exemplary system includes a first transmission subsystem (TS) configured to transmit and receive data to and from the remote system over a network. The exemplary system also includes an audio input subsystem (AIS) configured to accept data from a transmitting user and transmit that data to the remote system via the first TS. In addition, the exemplary system includes an input flow-control subsystem (IFCS) configured to continually receive EED updates from the remote system, determine when the EED exceeds a predetermined threshold based on the received EED updates, transmit a stop notification to the AIS when the EED is determined to exceed the threshold, and inform the transmitting user when the stop notification is transmitted to the AIS. The AIS, upon receiving the stop notification, is configured to stop accepting data from the transmitting user.

An exemplary embodiment of the present disclosure provides a system for limiting accumulation of end-to-end delay (EED), which represents a time interval between a time of acceptance of input data from a transmitting user utilizing a remote system and a time of outputting of the data to a receiving user, after transmission of the data over a network. The exemplary system includes a transmission subsystem (TS) configured to transmit and receive data to and from the remote system and a receiving user over the network. The exemplary system also includes an audio output subsystem configured to receive data from remote system via the TS and to output the received data to the receiving user, calculate, at predetermined intervals, an EED representing a time interval between a time of acceptance of input data from the transmitting user by the remote system and the current time at which the system is outputting the data to the receiving user, generate EED updates of the calculated interval, and transmit the generated EED updates to the remote system via the TS.

An exemplary embodiment of the present disclosure provides a system including an audio input subsystem (AIS) and an audio output subsystem (AOS) communicating with each other via a transmission subsystem utilizing a reliable message transport protocol (RMTP). During unfavorable network conditions, the system provides a fallback mode that ensures conversation intelligibility and eliminates dropouts. In the fallback mode, the system uses data retransmission and mitigates retransmission delay by breaking input and output audio into segments for flow control and by involving the users in flow control, as follows. On the receive end, when necessary, the system pauses audio output and indicates the pause to the receiving user via auditory or visual cues, informing the receiving user that the pause is a system artifact rather than silence from the transmitting user on the remote system. On the transmit end, when necessary to avoid accumulation of excessive end-to-end delay, the system suspends audio input and indicates the suspension to the transmitting user via auditory or visual cues, informing the transmitting user that audio input is temporarily being ignored. The transmit end of the system decides when to suspend audio input based on the current end-to-end delay, which is continually communicated from the receive end.

DETAILED DESCRIPTION

Figure 1:
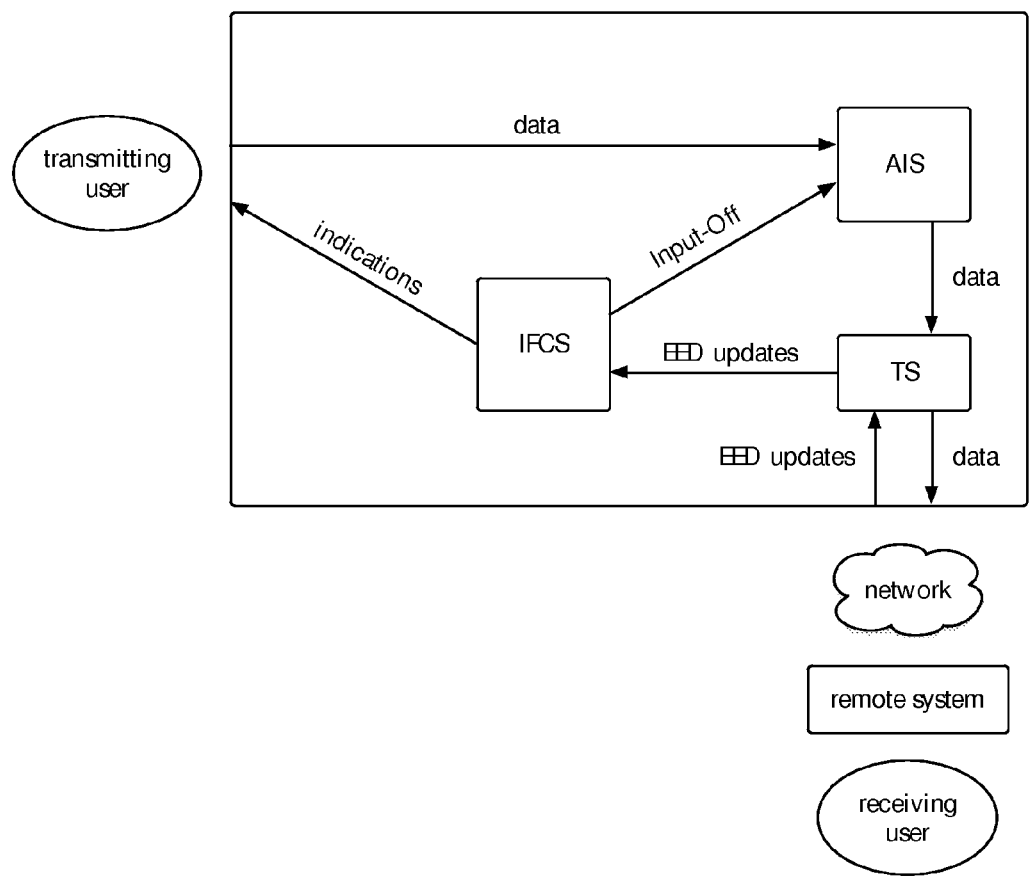
FIG. 1 is a block diagram of a system for limiting the accumulation of end-to-end delay in a communication network, according to an exemplary embodiment of the present disclosure.

The following abbreviations and definitions are used in the description of exemplary embodiments of the present disclosure.

Abbreviations
AAQ acceptable audio quality
AIS audio input subsystem
AOS audio output subsystem
EED end-to-end delay
PLM packet loss mitigation
RMTP reliable message transport protocol Audio Quality & Audio Delay Acceptable audio quality (AAQ) is audio quality at or above a certain minimum fidelity. The system always outputs audio to the receiving user's audio output with AAQ.

End-to-end delay (EED) is the difference between the time at which an audio sample is output to the receiving user and the time at which the audio sample was input by the transmitting user. According to an exemplary embodiment, EED may represent the calculated time interval between the time of acceptance of input data from a local transmitting user and the time of outputting of the data to a remote user served by a remote system.

Continuous audio is AAQ delivered to a user continuously and with end-to-end delay (EED) below a certain allowed maximum continuous-audio delay.

Audio Input and Output Subsystems

The audio input subsystem (AIS) and audio output subsystem (AOS) portions of the system perform transmit and receive processing (respectively) for audio and for user interaction. The AIS creates audio data from an audio source, such as a microphone, and then transmits it. The AOS receives transmitted audio data, and then outputs it to an audio destination, such as speaker or audio recording function.

Current Time

The system relies on being able to query a clock for an approximation of the current time in absolute terms, such as by reference to Universal Coordinated Time. At each end of a conversation, the closer the clocks are to the same standard of absolute time, the better the system will work.

Reliable Message Transport Protocol

The system uses a reliable message transport protocol (RMTP) that transports data in a sequence of messages. RMTP uses retransmission as necessary to ensure delivery of all messages.

At the receive end, RMTP delivers to the client each message when received from the underlying transport layer, in the order it was received from the underlying layer. RMTP assumes that its underlying layers do not reorder received messages.

At the transmit end, RMTP assigns a sequence number to each message. It is the receive end client's responsibility to use the message sequence numbers to organize messages received out of sequence into proper sequence.

The AIS and AOS are clients of RMTP for audio data transport.

In some cases the AOS will determine that a not-yet-received message is not needed because the AOS is able to construct AAQ without it by using PLM techniques. In such a case the RMTP allows the AOS to tell the RMTP to discard the unnecessary message, and as a result the RMTP will make no further attempts to retransmit it, although retransmission may already be in process.

For transmitting other types of data such as EED update messages, the system can use RMTP or other reliable transport protocol.

Audio Output Subsystem

The AOS has a receive buffer, which holds AAQ audio data.

The AOS extracts audio data from messages it receives from the RMTP and appends that audio data to its receive buffer, using PLM techniques as appropriate within the constraint that audio in the receive buffer must be AAQ.

When the time that will be required to output the audio data accumulating in the receive buffer exceeds a certain minimum amount, the AOS begins outputting the audio data from the receive buffer to the audio destination, thus entering outputting mode and starting an output segment When the duration of the audio data in the receive buffer falls below a certain duration, the AOS stops outputting audio to the output destination, thus entering paused mode and ending an output segment.

The AOS is in either outputting mode or paused mode, and under certain conditions the AOS transitions between these two modes to implement output flow control. The AOS indicates its current mode to the user. Indicating paused mode to the user prevents the user from mistaking a lack of audio during paused mode as silence from the transmitting user. The indication of paused mode to the user takes different forms depending on whether paused mode is forced by the receive buffer becoming empty or forced by use of the pause function or hold function in the user interface.

When the AOS transitions back to outputting mode, under certain conditions the AOS first outputs an amount of audio from the end of the previous output segment, so that the receiving user hears some overlap for context. These conditions are (1) when paused mode has lasted longer than a certain amount of time, or (2) when the most recent audio sample in the output buffer is designated as a cutoff sample.

The current time at which the AOS outputs an audio sample is its output time.

While the create time of the audio that the AOS is currently outputting is old enough that the currently outputting audio is delayed more than the amount permitted for continuous audio, the AOS reduces EED by shortening any periods of unimportant audio. Unimportant audio is audio that the system determines is effectively silence or noise and not speech, unless a user has directed the system not to use this feature.

During outputting mode, when the AOS outputs a cutoff sample, the AOS indicates this fact to the receiving user; this indication to the user informs the user of a point in time when audio input from the remote user was suspended. An appropriate audio indication for such an event might be, for example, a "snip" sound.

To limit the intrusiveness of output flow control, paused mode has a minimum duration. When transport conditions are bad enough that input flow control is heavily used, the system temporarily raises the minimum duration of paused mode.

End-To-End Delay Determination

The AIS creates each audio sample from the input source at a certain current time, which is the create time of that audio sample. The AIS maintains the association between each audio sample and its create time as the audio data travels through the system.

The end-to-end delay (EED) for an audio sample is the difference in time between the audio sample's output time and its create time.

At various times the AOS calculates the EED for the currently outputting audio sample, and sends the EED back to the other end in an EED update message. The AOS sends an EED update message whenever there is a discontinuity in the flow of create times of audio samples as they are output. Useful times for the sending of EED update messages are the first and last audio samples of an output segment and audio samples when the use of PDM techniques disrupts the normal flow of create times of audio samples as they are output.

Each time the AIS receives an EED update message newer than the most recently received EED update message, it updates an excessive EED (e.g., "input-off" in FIG. 1) boolean signal, setting it to true if the received EED exceeds a certain amount, otherwise setting it to false.

The system indicates to the user the EED of the received audio data currently being output by the AOS. The system also indicates to the user the EED of the received audio data currently being output by the AOS at the other end of the conversation.

Alternatively or in addition, the AIS can be configured to use the absence of a communication from the AOS to determine the extent of a delay.

Audio Input Subsystem

In listening mode the AIS creates audio data from the audio source, associates the audio data with its create time, and transmits the audio data and create time to the receive end.

In blocked mode, the AIS does not transmit any audio from the input source to the receive end.

The AIS is either in listening mode or blocked mode. Under certain conditions, the AIS transitions between these two modes to implement input flow control. The AIS indicates its current mode to the user. Indicating blocked mode to the user dissuades the transmitting user from speaking or creating other audio that will not be delivered. One way in which the AIS indicates blocked mode to the user is by withholding sidetone feedback from the transmitting user.

When the AIS enters listening mode, the AIS simultaneously starts a begin-listening timer, which is active until it expires. The begin-listening timer is active only while the AIS is in listening mode.

After the begin-listening timer becomes inactive, if the excessive EED signal is true, the AIS starts a warning timer. The AIS indicates to the user when the warning timer is active, so the user knows that the AIS may soon transition from listening mode to blocked mode. While the warning timer is active, the AIS restarts the warning timer while the user is speaking, to give the user extra time if needed. If the excessive EED signal goes false while the warning timer is active, the AIS cancels the warning timer and restarts the begin-listening timer. When the warning timer expires, the AIS transitions to blocked mode.

After the AIS has been in blocked mode for a certain amount of time, if the excessive EED signal becomes false, the AIS transitions back into listening mode.

When the AIS transitions into blocked mode, it designates the last audio sample of the preceding segment of listening mode as a cutoff sample, so that the AOS on the receive end can process it specially.

To limit the intrusiveness of input flow control, listening mode has a minimum duration, and blocked mode has a minimum duration. When transport conditions are bad enough that output flow control is heavily used, the system temporarily raises minimum duration of listening mode.

Continuous Audio vs Flow-Controlled Audio

When the data transport medium is not working well enough to support continuous audio, the AOS employs output flow control so that it can provide AAQ. The imposition of output flow control usually forces the AIS at the other end to implement input flow control.

While the system is providing continuous audio, neither input flow control nor output flow control is active. The following cascade of events happens when the system departs from providing continuous audio and starts using output flow control:

1. The AOS notices that audio data flow from the network is not sufficient for it to output continuous audio; therefore,
2. the AOS begins output flow control by pausing output, thus breaking up audio output into output segments; as a result,
3. the AIS at the other end notices that recent audio it has transmitted has excessive EED; and therefore,
4. the AOS begins input flow control by suspending input, thus breaking up audio input from the user into input segments, thus lowering the EED by giving the AOS at the other end time to catch up.

After network conditions improve enough for the system to provide continuous audio, (1) the AOS receives sufficient audio data to continue to output audio data indefinitely within an output segment of ever-increasing length, and (2) the excessive EED signal remains false, so the AIS continues indefinitely to take audio input from the user and to transmit it.

Input Flow Control User Interaction

When performing input flow control, the AIS proceeds through these steps:

1. The AIS indicates to the user that it is accepting user audio input and transmitting it;
2. while transmitting user audio input, the AIS gives the user a warning indication that the AIS will soon stop accepting audio input from the user;
3. the AIS indicates to the user (for an indefinite period) that the AIS is not accepting user audio input;
4. the AIS ceases the indication that it is not accepting user audio input and resumes accepting user audio input and transmitting it (back to step 1).

The warning indication and "not accepting user input" indications allow the user to know when to speak and when not to speak because his audio input would be ignored.

Output Flow Control User Interaction

When performing output flow control, the AOS proceeds through these steps:

1. the AOS indicates to the user that it is outputting received audio to the receiving user's output destination;
2. the AOS indicates to the user that audio output is paused because reception of audio data from the transmitting user is delayed;
3. the AOS ceases the reception-paused indication and resumes the outputting of audio from the transmitting user (back to step 1).

When audio output is paused, the indication of this fact to the user makes clear that he is not experiencing a period of silence from the other end and that audio from the other end is not being deleted by the system because of transmission trouble.

Other User Interaction

The system affords various types of user interaction that interact with the flow control features of the system.

The system has a user pause function, which allows the receiving user to direct the system to force the AOS to change from outputting mode to user-paused mode and back. User-paused mode is like paused mode except that the system indicates the mode to the receiving user differently from how it indicates paused mode. The normal mechanisms of the system ensure that the AIS uses blocked mode as necessary so that no transmitted audio is lost while the AOS is in paused mode as directed by the receiving user.

The system has a user-hold function, which allows a user to direct the system to enter or leave its user-hold mode at his end. If either end of the conversation is in user-hold mode, the conversation is in hold mode. While the system is in hold mode, the system is forced also to be in paused mode. The conversation remains in hold mode until neither user's end of the conversation is in user-hold mode. The system also has a remote-hold mode, and the system uses messaging to maintain remote-hold mode as a mirror of user-hold mode at the other end. The system indicates user-hold mode and remote-hold mode to the user. The following example shows how the system avoids confusion over user intentions regarding hold: User A initiates user-hold mode, then user B also initiates user-hold mode; then, user A cancels user-hold mode; now (1) user B can see that A is ready for the conversation to leave hold mode, and (2) user A can see that user B is not yet ready for the conversation to leave hold mode; finally, user B cancels user-hold mode, and the conversation leaves hold mode.

The system allows the user to select from his music own library the audio that he will hear when the AOS is in user-hold mode or remote-hold mode. Thus while the user is on hold he need not ever be subjugated to hold music or other audio transmitted from the other end.

The system allows a user to direct the AOS to be in perfect reception mode. In perfect reception mode, the AOS waits for all audio data messages in sequence, so that it can deliver accurate audio to the receiving user, avoiding all use of PLM techniques.

The system allows a user to direct the AOS to be in streaming mode. While the AOS is in streaming mode, the AOS directs the remote AIS to avoid entering blocked mode.

The system allows a user to direct the AIS to be in uninterrupted mode. While the AIS is in uninterrupted mode, the AIS remains in listening mode. This feature might be called "push-to-talk".

The system allows a user to direct the AOS to make a recording of both ends of the conversation; while recording, the AOS uses all received audio data messages for the recording even if it does not use all of them for the audio it outputs to the receiving user's output destination. In the recorded data, the system stores audio creation time and output time; the system, using additional messaging, also stores data indicating incoming audio messages that were not used in constructing output audio for each end. Thus the recorded data can be later used to reconstruct the conversation from the perspective of either user. Because of the nature of the system, the recorded audio is AAQ. Depending on user settings the recorded audio can be beyond AAQ, i.e., lossless.

When a user does not answer an incoming call, the system uses its ability to make an AAQ recording so that the caller can leave a voice message that is guaranteed to be intelligible. While the caller is leaving a voice message, the caller end's AIS buffers audio data as much as possible so that the caller end's AIS can remain in listening mode. While the caller is leaving a voice message, the system outputs to him a user input control to allow the user to signal the end of the recording. After the voice message audio data has been completely transmitted, the system indicates to the caller that it is OK to hang up.

The operative features of the present disclosure were described above with regard to the functions performed in the system. It is to be understood that devices in the system such as the AIS, AOS and a device implementing the RMTP transmissions are each implemented by a computer processing device having a processor and a non-transitory computer-readable recording medium (e.g., ROM, hard disk drive, flash memory, optical memory, etc.) that has recorded thereon a computer program that, when executed by the processor, causes the processor to perform the operative features of that device. The processor can be a general-purpose processor (e.g., processors produced by Intel or AMD) configured to execute the computer program tangibly recorded on the non-transitory computer-readable recording medium. Alternatively, the processor can be an application specific processor that is specifically configured to carry out the operative features described herein.

Figure 2:
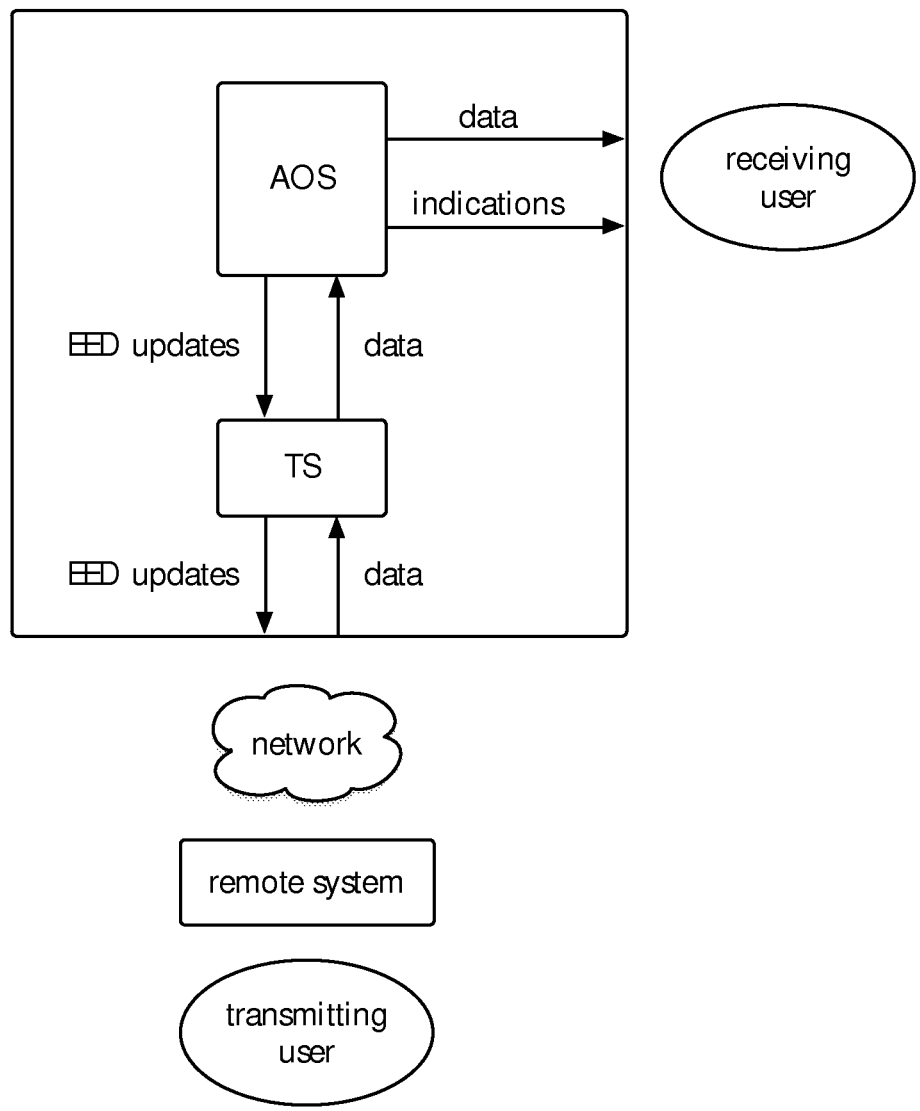
FIG. 2 is a block diagram of a system for limiting the accumulation of end-to-end delay in a communication network, according to an exemplary embodiment of the present disclosure.

FIGS. 1 and 2 are block diagrams illustrating various features of exemplary embodiments of the present described above. FIG. 1 illustrates components of the system for accepting data input from a local transmitting user and transmitting the input data to a remote receiving user. FIG. 2 illustrates components of the system for receiving data from a remote system and outputting the received data to a local receiving user. The systems of FIGS. 1 and 2 are for limiting the accumulation of EED. In the exemplary embodiments of FIGS. 1 and 2, EED represents the calculated time interval between the time of acceptance of input data from a transmitting user and the time of outputting to a remote user served by a remote system, after transmission of the data over a network (e.g., the Internet).

In accordance with the exemplary embodiments described above, the exemplary system of FIG. 1 includes a transmission subsystem (TS) which is configured to transmit/receive data to/from a remote system over a network. The exemplary system also includes an audio input subsystem (AIS) configured to accept data input by a transmitting user served by the local system and to transmit the input data to the remote system via the TS for the benefit of a remote receiving user. In addition, the exemplary system of FIG. 1 includes an input flow-control subsystem (IFCS). In the illustration of FIG. 1, the IFCS is illustrated as being a separate component from the AIS for clarity of illustration. However, it is to be understood that the AIS can perform the functions of the IFCS such that the functions of both the AIS and IFCS are implemented by a common computing entity (e.g., the same computer processing device or component of a computer processing device). The IFCS continually receives (at intervals determined by the remote system) EED updates from the remote system via the TS. The EED updates are transmitted by the AOS as described above. During periods when the EED exceeds a threshold, which is configurable based on a desired user experience with respect to a desired maximum end-to-end delay (e.g., 2 seconds), the IFCS sends a stop notification (input-off signal) to the AIS. When the AIS receives the input-off signal, the AIS does not accept any further data from the local transmitting user for the time being. The IFCS informs the transmitting user as to whether it is sending an input-off signal to the AIS to thereby inform the transmitting user whether additional data will be accepted by the AIS.

According to an exemplary embodiment, the IFCS is configured to transmit a resume notification to the AIS after the EED is determined to no longer exceed the threshold, while the AIS is not accepting data from the transmitting user after receiving the stop notification. The AIS is configured to resume accepting input data from the transmitting user upon receiving the resume notification. The IFCS informs the transmitting user when the resume notification is transmitted to the AIS. According to another exemplary embodiment, the IFCS is configured to cease transmitting the stop notification to the AIS after the EED is determined to no longer exceed the threshold, while the AIS is not accepting data from the transmitting user after receiving the stop notification. The AIS is configured to resume accepting input data from the transmitting user upon the IFCS ceasing transmission of the stop notification, and the IFCS informs the transmitting user when transmission of the stop notification to the AIS ceases.

FIG. 2 represents an exemplary embodiment of the receive side of the system of the present disclosure. Similar to FIG. 1, the system of FIG. 2 includes a transmission subsystem (TS) which is a communicative interface to a remote system via an external network (e.g., the Internet). The TS of FIG. 2 is configured to transmit/receive data to/from the remote system over the network. The system of FIG. 2 includes an AOS in accordance with the exemplary embodiments described above. The AOS is configured to receive data from the remote system via the TS, and to output the received data to a receiving user local to the system of FIG. 2. The AOS also continually calculates (e.g., every 200 milliseconds) the interval between the current time and the acceptance time associated with the data being output to the receiving user. According to an exemplary embodiment, the acceptance time can be defined as the time when the audio-video device of the (remote) transmitting user (e.g., the user's computer) accepted the data that is currently being output to the receiving user by the AOS. The AOS continually (e.g., at regular intervals such as every 200 milliseconds) transmits EED update notifications to the remote system via the TS. The EED update notifications are transmitted to and continuously received by the TS of FIG. 1 in accordance with the exemplary embodiment described above.

It will be appreciated by those skilled in the art that the present invention can be embodied in other specific forms without departing from the spirit or essential characteristics thereof. The presently disclosed embodiments are therefore considered in all respects to be illustrative and not restricted. For example, the foregoing features of the present disclosure can be applied to multiple user conversations (e.g., three or more users) as well as to two-person conversations.

What is claimed is:

1. A system for limiting accumulation of end-to-end delay (EED), which represents a time interval between a time of acceptance of input data from a transmitting user and a time of outputting of the data to a receiving user utilizing a remote system, after transmission of the data over a network, the system comprising:
   a first transmission subsystem (TS) configured to transmit and receive data to and from the remote system over a network;
   an audio input subsystem (AIS) configured to accept input data from a transmitting user and transmit the accepted input data to the remote system via the first TS; and
   an input flow-control subsystem (IFCS) configured to continually receive EED updates from the remote system, suspend audio input and indicate the suspension to the transmitting user via a suspension notification to inform the transmitting user that audio input is temporarily being ignored in order to avoid accumulation of excessive EED when the EED is determined to exceed the threshold based on the received EED updates, and inform the transmitting user when the suspension notification is transmitted to the AIS,
   wherein the AIS, upon receiving the suspension notification, is configured to stop accepting data from the transmitting user.

2. The system of claim 1, wherein the IFCS is configured to transmit a resume notification to the AIS after the EED is determined to no longer exceed the threshold, while the AIS is not accepting data from the transmitting user after receiving the suspension notification,
   wherein the AIS is configured to resume receipt of data from the transmitting user upon receiving the resume notification, and
   wherein the IFCS informs the transmitting user when the resume notification is transmitted to the AIS.

3. The system of claim 1, wherein the IFCS is configured to cease transmitting the suspension notification to the AIS after the EED is determined to no longer exceed the threshold, while the AIS is not accepting data from the transmitting user after receiving the suspension notification,
   wherein the AIS is configured to resume acceptance of data from the transmitting user upon the IFCS ceasing transmission of the suspension notification, and
   wherein the IFCS informs the transmitting user when transmission of the suspension notification to the AIS ceases.

4. The system of claim 1, comprising:
   a second TS configured to transmit and receive data to and from the remote system over the network; and
   an audio output subsystem (AOS) configured to
   receive data from the first TS via the network and to output the received data to the receiving user,
   calculate, at predetermined intervals, an EED representing a time interval between a time of acceptance of input data from the transmitting user by the remote system and the current time at which the system is outputting the data to the receiving user, and
   generate EED updates of the calculated interval, and transmit the generated EED updates to the first TS via the network.

5. A system for limiting accumulation of end-to-end delay (EED), which represents a time interval between a time of acceptance of input data from a transmitting user utilizing a remote system and a time of outputting of the data to a receiving user, after transmission of the data over a network, the system comprising:
   a transmission subsystem (TS) configured to transmit and receive data to and from the remote system and a receiving user over the network; and
   an audio output subsystem configured to
   receive data from remote system via the TS and to output the received data to the receiving user,
   calculate, at predetermined intervals, an EED representing a time interval between a time of acceptance of input data from the transmitting user by the remote system and the current time at which the system is outputting the data to the receiving user, and
   generate EED updates of the calculated interval,
   transmit the generated EED updates to the remote system via the TS; and
   suspend audio input and indicate the suspension to the transmitting user via a suspension notification to inform the transmitting user that audio input is temporarily being ignored in order to avoid accumulation of excessive EED when the EED is determined to exceed the threshold based on the received EED updates.

6. A system for providing intelligible audio conversation over a transmission medium, the system comprising:
an audio input subsystem (AIS);
an audio output subsystem (AOS); and
a transmission subsystem configured to allow the AIS and AOS to communicate with each other utilizing a reliable message transport protocol (RMTP),
wherein the transmission subsystem provides a fallback mode that, during a time of network unreliability in which the network cannot reliably and timely deliver communications between the AIS and AOS, the transmission subsystem configures the
AIS and AOS to utilize data retransmission and mitigates retransmission delay by breaking input and output audio into segments for flow control and by involving a receiving user of the AOS and a transmitting user of the AIS in flow control,
wherein, during the time of network unreliability, the AOS is configured to pause audio output and indicate the pause to a receiving user via auditory and/or visual cues to inform the receiving user that the pause is a system artifact rather than silence from a transmitting user of the AIS,
wherein the AIS, in order to avoid accumulation of excessive end-to-end delay during the time of network unreliability, is configured to suspend audio input and indicate the suspension to the transmitting user via auditory and/or visual cues to inform the transmitting user that audio input is temporarily being ignored, and
wherein the AIS is configured to decide when to suspend audio input based on the current end-to-end delay, which is continually communicated from the AOS.

* * * * *